United States Patent [19]

Matsuda

[11] Patent Number: 5,071,601

[45] Date of Patent: Dec. 10, 1991

[54] METHOD FOR STRETCHING WEB OF PLASTIC SHEET INTO ARCUATE FORM

[75] Inventor: Naohiko Matsuda, Matsusaka, Japan

[73] Assignee: Central Glass Company, Limited, Ube, Japan

[21] Appl. No.: 541,780

[22] Filed: Jun. 21, 1990

[30] Foreign Application Priority Data

Jun. 30, 1989 [JP] Japan .................................. 1-167020

[51] Int. Cl.⁵ ............................................. B29C 55/06
[52] U.S. Cl. ..................................... 264/25; 264/288.4
[58] Field of Search .................. 264/288.4, 290.2, 291, 264/292, 25

[56] References Cited

U.S. PATENT DOCUMENTS

| | | | |
|---|---|---|---|
| 3,019,475 | 2/1962 | Smith | 425/335 |
| 3,038,208 | 6/1962 | Fujioka | 264/291 |
| 3,696,186 | 10/1972 | Stark et al. | 264/292 |
| 3,885,899 | 5/1975 | Gurta et al. | 264/292 |
| 3,912,440 | 10/1975 | Koss et al. | 264/288.4 |

Primary Examiner—James Lowe
Attorney, Agent, or Firm—Fleit, Jacobson, Cohn, Price, Holman & Stern

[57] ABSTRACT

The invention relates to streching of a continuous web of a thermoplastic sheet, such as polyvinyl butyral sheet, having straight longitudinal edges into an arcuate form to use it as an interlayer of curved and laminated windshields of vehicles. Usually the web has a colored band to serve as a glare shield band along its one longitudinal edge. First the web travels vertically downward and is heated from its both sides by a vertical heater to produce a gradient of temperature across the width of the web such that the temperature at the web edge remote from the colored band becomes higher than the temperature at the opposite edge. Under longitudinal tension the heated web is passed around a first heated tapered roll and then around a second heated tapered roll having a higher temperature. Over these tapered rolls the web edge remote from the colored band is located relatively near the large diameter end of each tapered roll. The web stretched by the two heated rolls is successively passed over a plurality of cooled tapered rolls. By this method the web is smoothly stretched into a desired arcuate form without appearance of defects such as wrinkles or streaks on the stretched web.

9 Claims, 2 Drawing Sheets

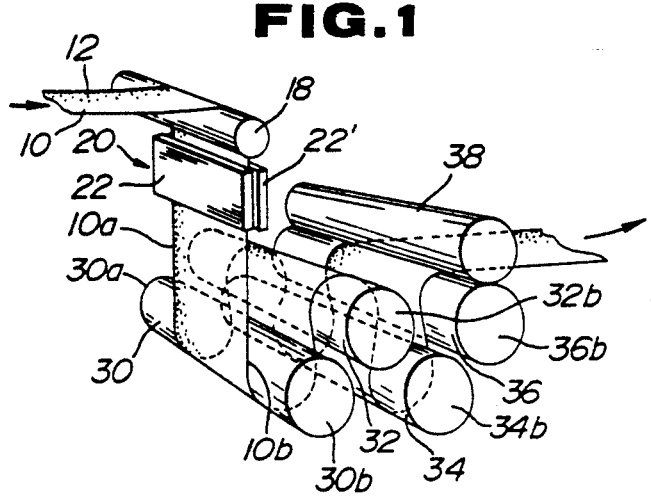
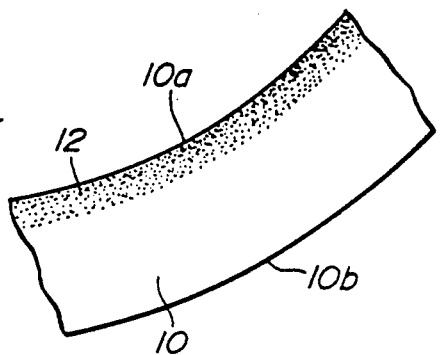
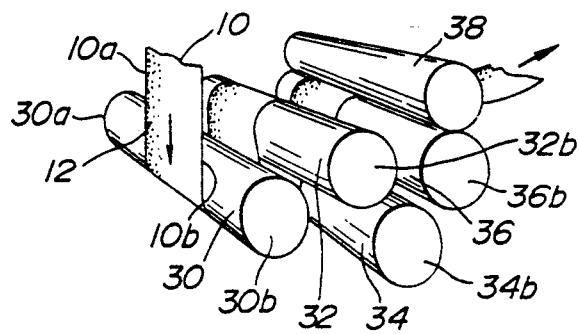
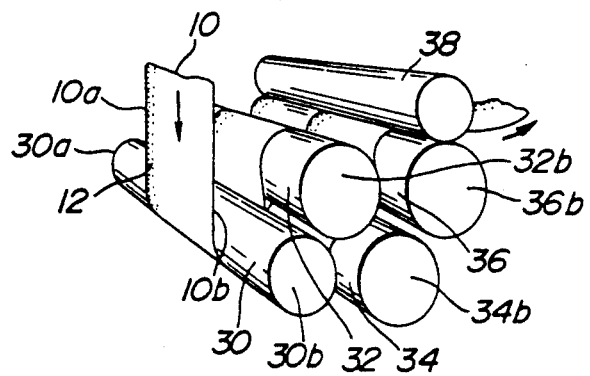

METHOD FOR STRETCHING WEB OF PLASTIC SHEET INTO ARCUATE FORM

BACKGROUND OF THE INVENTION

This invention relates to a method of continuosly stretching a web of a thermoplastic sheet into an arcuate form and an apparatus for the stretching method. The thermoplastic sheet is for use as an interlayer of laminated glass, and the arcuately stretched web of the plastic sheet is to be cut into sections each of which is for use as an interlayer of a curved and laminated glass panel such as an automobile windshield.

Laminated safety glass is produced by sandwiching a thermoplastic interlayer between two glass sheets. Usually the thermoplastic interlayer is a sheet of a polyvinyl acetal represented by polyvinyl butyral.

In current automobiles and other vehicles it is prevailing to employ curved and laminated glass panels as windshields, and it is often that a curved windshield has a glare shield band extending along the top edge. Usually polyvinyl butyral sheet for use as an interlayer of laminated glass is supplied in the form of a rolled, continuous web having straight longitudinal edges. For windshields having a glare shield band, the web of polyvinyl butyral sheet has a colored band along and contiguous to one longitudinal edge of the web. Prior to the lamination operation to produce curved and laminated windshields by using a web of polyvinyl butyral sheet having a colored band, it is necessary to stretch the web of polyvinyl butyral such that the stretched web has longitudinal edges formed into arcuate configurations with different arc lengths. That is, the web needs to be arcuately stretched to a greater extent at the edge remote from the colored band than at the edge adjacent the colored band.

Several methods have been proposed for the above described stretching of a web of a thermoplastic sheet into an arcuate form. U.S. Pat. No. 3,038,208 discloses to accomplish the desired stretching by producing a temperature gradient across the width of a web of a thermoplastic sheet. That is, while the web is stretched between rolls the web is heated by dielectric or infrared heating units such that the degree of heating minimizes at the edge adjacent the colored band. At the subsequent cooling of the stretched web the plastic web has greater tendency to shrinkage at the edge heated to the lower temperature than at the opposite edge, so that the cooled web has arcuate edges with different arc lengths. In this method the arcuate shaping relies solely on the different tendencies to shrinkage at the opposite ends of the web subjected to gradient heating. However, it is difficult to precisely control the tendencies to shrinkage for obtaining an arcuate form of desired curvatures. Besides, this method pays little attention to the rate of raising the temperature of the web. If the web of thermoplastic is very rapidly heated to a temperature sufficient for stretching it is often that local shrinkage occurs in the stretched and cooled web, or longitudinal wrinkles or streaks appear on the web surfaces.

U.S. Pat. No. 3,019,475 shows a stretching method having the steps of passing a web of thermoplastic around a heated cylindrical roll and then around a heated tapered roll to thereby stretch the web into an arcuate form and then passing the heated web around a cooled tapered roll. This method does not produce a gradient of temperature across the width of the web. Therefore, the web under stretching is liable to droop in one edge region where arcuate stretching to a relatively smaller extent is intended. In this method the web is heated in two stages first by the cylindrical roll and then by the tapered roll, but according to the disclosure both of these two rolls are kept heated at about 100° C. Rapid heating of the plastic web to such a high temperature renders the web tacky so that the heated web is liable to stick to the rolls or droop. U.S. Pat. No. 3,696,186 shows a stretching method having the steps of uniformly heating a web of a thermoplastic sheet, stretching the heated web into an arcuate form between a cylindrical roll and a tapered roll and cooling the stretched web while it is passing around the cylindrical roll. Since the web is heated without producing a gradient of temperature across the width of the web there is the aforementioned problem of drooping of the web at its one edge region. Besides, rapid heating of the web to a temperature of about 65°-75° C. often causes local shrinkage of the stretched web or results in appearance of wrinkles or streaks on the stretched web. Precedent to the stretching operation by this method the web is heated in a separate station, but this is unfavorable for the overall efficiency of the stretching process.

SUMMARY OF THE INVENTION

It is an object of the present invention to provide an improved method of stretching a continuous web of a thermoplastic sheet having straight longitudinal edges into an arcuate form with different arc lengths at the opposite edges, by which method the stretching into the desired arcuate form can efficiently be accomplished without suffering from defects on the stretched web such as wrinkles or streaks even when the desired arcuate form has relatively large curvatures.

It is another object of the invention to provide an apparatus for the stretching method according to the invention.

According to the invention there is provided a method of stretching a continuous web of a thermoplastic sheet into an arcuate form, the method comprising the steps of (a) heating the web from its both sides while the web is travelling substantially vertically downward so as to produce a gradient of temperature across the width of the web and raise the temperature of the web to a first temperature at a first longitudinal edge of the web and to a second temperature lower than the first temperature at a second longitudinal edge of the web, (b) applying longitudinal tension to the web heated in step (a) and passing the web partially around a first tapered roll which is heated to a temperature higher than said first temperature and arranged such that the first longitudinal edge of the web is located relatively near the large diameter end of the tapered roll, (c) following step (b) passing the web partially around a second tapered roll which is heated to a temperature higher than the temperature of the first tapered roll and arranged such that the first longitudinal edge of the web is located relatively near the large diameter end of the second tapered roll, longitudinal edge, and (d) following step (c), successively passing the web partially around a plurality of cooled rolls each of which is a tapered roll arranged such that the first longitudinal edge of the web is located relatively near the large diameter end of each cooled roll.

When the thermoplastic sheet is a polyvinyl butyral sheet for use as an interlayer of laminated glass, said first temperature is from about 50° C. to about 60° C. and said second temperature is from about 30° C. to about 40° C., and at step (c) the temperatures of the web reach 65-90 C. at the first longitudinal edge and to 45-60 C. at the second longitudinal edge.

A stretching apparatus according to the invention comprises a vertical heater comprising heating elements arranged so as to heat the web from both its sides while the web is travelling substantially vertically downward and produce a gradient of temperature across the width of the web such that the web is heated to a first temperature at its first longitudinal edge and to a second temperature at its second longitudinal edge, a first tapered roll which is heated to a temperature higher than said first temperature and arranged such that the web heated by the vertical heater passes partially around the first tapered roll with the first longitudinal edge of the web located relatively near the large diamter end of the tapered roll, a second tapered roll which is heated to a temperature higher than the temperature of the first tapered roll and arranged close to the first tapered roll such that the web departed from the first tapered roll passes partially around the second tapered roll with the first longitudinal edge of the web located relatively near the large diameter end of the second tapered roll, and a plurality of cooled rolls which are tapered rolls arranged such that the web departed from the second tapered roll successively passes partially around the cooled rolls with the first longitudinal edge of the web located relatively near the large diameter end of each of the cooled rolls.

According to the invention the web to be stretched is first heated from both its sides so as to produce a desired gradient of temperature across the width of the web. This heating is made while the web is travelling vertically downward by using a vertical heater. Therefore, it is easy to equally heat the both sides of the web. If the web is heated while travelling horizontally by using a horizontal heater it is likely that a difference in temperature is produced between the upper and lower surfaces of the web, and the difference in temperature will cause a difference in contraction stress and, besides, drooping of the web. By heating with a vertical heater it is easy to produce a desired gradient of temperature across the width of the web, so that the subsequent stretching of the web into a desired arcuate form can be accomplished efficiently and accurately. Preferably this heating is made by far-infrared radiation for rapidly and uniformly heating the web throughout the thickness of the web.

At the initial heating of the web the maximum temperature of the web at its one longitudinal edge is adequately limited. In the case of a web of polyvinyl butyral the maximum temperature is limited to about 60° C. This is effective for accomplishment of stretching of the web without local shrinkage of the web and without appearance of longitudinal wrinkles or streaks on the stretched web.

After producing a gradient of temperature across the width of the web, the web is longitudinally tensioned and passed over a heated tapered roll and then over another heated tapered roll. The two rolls are differently heated. While in engagement with the first tapered roll the web is further heated and stretched into a slightly arcuate form. Over the second tapered roll having a higher temperature, the web is further heated and further stretched into a more steeply arcuate form. By this two-stage stretching process the web is smoothly stretched into a desired arcuate form so that the stretched web is free of defects such as wrinkles or streaks, and it is possible to produce an arcuate web with sufficiently large curvatures.

The present invention is advantageously applicable to polyvinyl butyral webs which have a colored band to serves as a glare shield band and are to be used as interlayers in the manufacture of curved and laminated windshields for automobiles and other vehicles.

BRIEF DESCRIPTION OF THE DRAWINGS

FIG. 1 is a perspective view of a principal portion of an apparatus according to the invention for stretching a web of a plastic sheet;

FIGS. 2 and 3 show, in similar perspective views, two different modifications of the tapered rolls in the apparatus of FIG. 1, respectively;

FIG. 4 is a fragmentally plan view of a web of a plastic sheet stretched into an arcuate form;

DESCRIPTION OF THE PREFERRED EMBODIMENTS

Figure 5:
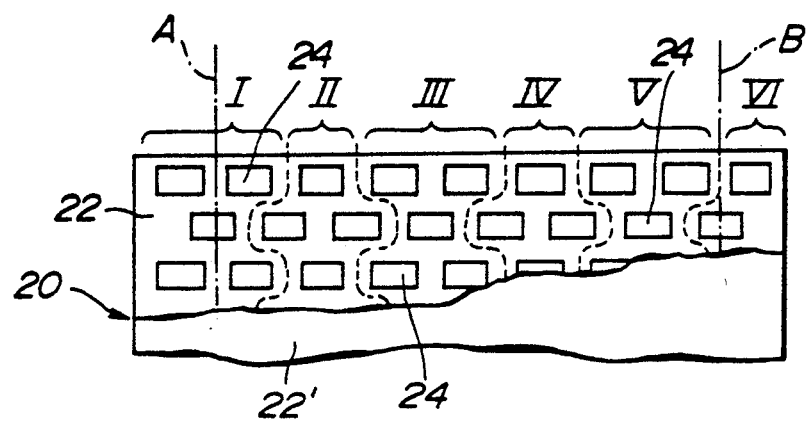
FIG. 5 is a fragmentary and partly cutaway elevational view of the vertical heater in FIG. 1.

FIG. 1 illustrates an embodiment of the invention for stretching a continuous, constant width web 10 of a thermoplastic sheet having straight longitudinal edges 10a and 10b into an arcuate form which is explanatorily shown in FIG. 4. The thermoplastic sheet is for use as an interlayer of a curved and laminated glass panel represented by a vehicle windshield. Usually the thermoplastic material is polyvinyl butyral. To produce a curved and laminated windshield provided with a glare shield band in the uppermost region, the web 10 of the plastic sheet has a colored band 12 extending along one longitudinal edge 10a of the web. In the stretched web 10 shown in FIG. 4 both of the longitudinal edges 10a and 10b are arcuate, and the two edges 10a and 10b have different arc lengths. Compared with the edge 10a adjacent the colored band 12, the opposite edge 10b is more greatly extended by about 20 to 30%. In the stretched web 10 the colored band 12 is arcuate, but the arcuate form of the stretched web 10 is designed such that when a curved and laminated windshield using a section of the stretched web as the interlayer is installed in an automobile the colored band 12 appears as a straight band.

The web 10 is fed from a reel (not shown) to the stretching apparatus shown in FIG. 1. The web 10 is passed over a transfer roll 18 and departs from the roll 18 vertically downward. The stretching apparatus has a vertical heater 20 which is located beneath the transfer roll 18 and consists of a pair of heat panels 22 and 22' arranged opposite to each other such that the web 10 passes between the two heat panels. Below the vertical heater 20 there is a first heated roll 30 which is a rotatable tapered roll elongate horizontally. The tapered roll 30 is arranged such that when the web 10 is passed around the roll 30 the colored edge 10a of the web 10 is located relatively near the small diameter end 30a of the roll 30 and the opposite edge 10b relatively near the large diameter end 30b. Close to and slightly obliquely above the roll 30 there is a second heated roll 32 which is rotatable tapered roll. This roll 32 too is horizontally elongate, and the larger diameter end 32b of this roll 32 is located near the large diameter end 30b of the first heated roll 30. At a short distance from and obliquely above the second heated roll 32 there is a first cooled roll 34 which is a rotatable tapered roll, and close to and obliquely above the roll 34 there is a second cooled roll 35 which too is a rotatable tapered roll. The cooled rolls 34 and 36 are horizontally elongate, and these two rolls 34, 36 are tapered in the same direction as the heated rolls 30, 32. To transfer the stretched and cooled web of the plastic sheet from the stretching apparatus to a next station, a free roll 38 abuts on the second cooled roll 36 so as to be driven by the revolutions of the cooled roll 36.

Usually the heated and cooled rolls 30, 32, 34, 36 are made of a steel. In the embodiment shown in FIG. 1 these four rolls 30, 32, 34, 36 are of the same dimensions. For example, each of these roll is about 200 cm in length, about 35 cm in the diameter of the large end and about 15 cm in the diameter of the small end. It is preferred to heat the rolls 30 and 32 by internal heating using hot water or an alternative heating medium and cool the rolls 34 and 36 by internal cooling using cold water or an alternative cooling medium. The details of the internal heating and cooling will be described later.

The shaft of each of the tapered rolls 30, 32, 34, 36 is rotatably mounted on arms (not shown) attached to a supporting structure (not shown). The distance between the first and second heated rolls 30 and 32 is adjustable, and the distance between the first and second cooled rolls 34 and 36 is also adjustable. Besides, each of these rolls 30, 32, 34, 36 can axially be moved to some extent. Each of these rolls 30, 32, 34, 36 may be provided with a driving motor (not shown) connected to the shaft protruding from the small diamter end of the roll. Alternatively, the first heated roll 30 and the first cooled roll 34 may be free rolls which revolve as the web 10 travels over and in contact with every roll.

The vertical heater 20 is constructed so as to accomplish gradient heating of the web 10 across the width of the web. It is preferred to use far-infrared radiation heater elements in the heat panels 22 and 22' because far-infrared radiation is suitable for uniform heating of the web 10 throughout the thickness of the web. Referring to FIG. 5, each of the heat panels 22 and 22' has a number of far-infrared radiation heater elements 24 in a staggered arrangement. In FIG. 5 the chain line A indicates the position of the edge 10a of the web 10 passing through the vertical heater 20 and the chain line B the position of the opposite edge 10b of the web. In the illustrated example the far-infrared heater elements 24 of each heat panel 22, 22' are divided into six sections, I to VI, and the heating capabilities of these six sections are regulated differently from each other. That is, the heating power of the heat panel 22, 22' is the lowest in the section I near the line A and gradually augments in the remaining five sections to become highest in the section VI near the line B. For example, assuming that the web 10 is of a polyvinyl butyral sheet, the heater elements 24 in the section I and section VI are respectively regulated so as to heat the web 20 to about 30° to 40° C. in an edge region contiguous to the colored edge 10a and to about 50° to 60° C. in the opposite edge region contiguous to the edge 10b, while the heater elements 24 in the remaining sections II to V are respectively regulated for widthwise gradient heating of the web between about 40° C. and about 60° C.

In the operation for arcuately stretching the web 10 of polyvinyl butyral, hot water having a temperature of 70°-90° C. (e.g. about 75° C.) is continuously supplied to the tapered roll 30 in order that the temperatures of the web 10 passed through the above described vertical heater 20 further rise to 60°-65° C. at the edge 10b and to 40°-50° C. at the opposite edge 10a while the web is passing partially around the heated tapered roll 30. Needless to mention, tension is provided to the web 10 by a usual tensioning means (not shown). The next tapered roll 32 is supplied with hot water having a temperature of 75°-95° C. (e.g. 80° C.) in order to heat the web 10 to 65°-90° C. (preferably to 65°-70° C.) at the edge 10b and to 45°-60° C. (preferably to 52°-58° C.) at the opposite edge 10a while the web 10 is passing partially around the tapered roll 32. For example, the second heated roll 32 is driven such that the web 10 passes over the roll 32 at a speed of 3 m/min, and the first heated roll 30 (which may be either a driving roll or a free roll) is revolved at the same speed as the second heated roll 32 or at a speed several percent lower to promote stretching of the web 10. Besides the widthwise gradient temperatures of the web 10, a larger diameter section of each of the tapered rolls 30, 32 applies a greater stretching action to the web 10 so that the edges 10a and 10b of the web 10 become arcuate with a greater arc length at the edge 10b.

The tapered rolls 34 and 36 are supplied with water having a temperature of about 5° C. or lower in order to cool the stretched web 10 to a temperature of about 15° C. or lower while the stretched web passes partially around the first cooled tapered roll 32 and then partially around the second cooled tapered roll 34. For example, the first cooled tapered roll 34 is a free roll, and the second cooled roll 34 is driven at such a rate that the web 10 passes over the two cooled rolls 34, 36 at a speed higher than the speed over the heated roll 32 by 5 to 10%. Such an increase in the transfer speed of the web 10 is for preventing slacking of the web and rapidly cooling the stretched web. The free roll 38 revolving on the second cooled tapered roll 36 exerts its own weight on the stretched web 10 passing over the cooled roll 36 in order to transfer the web 10 to a next station.

The number of the cooled tapered rolls (34, 36) is not limited to two. If desired the stretching apparatus may include more than two cooled tapered rolls.

In the embodiment shown in FIG. 1, the four tapered rolls 30, 32, 34, 36 are arranged such that the large diameter ends 30b, 32b, 34b, 36b of the four rolls are contained in a vertical plane. In the modification shown in FIG. 2, the second heated tapered roll 32 is axially dislocated such that the large diameter end 32b of this roll 32 protrudes from the plane of the large diameter end 30b of the first heated tapered roll 30, and the two cooled tapered rolls 34, 36 and the free roll 38 are also axially dislocated in the same direction. Therefore, the web 10 passes over a lengthwise middle section of the first heated tapered roll 30 and then passes over a relatively thinner section of the second heated tapered roll 32, whereby the edge 10a, 10b of the web 10 can easily be stretched arcuately with relatively large curvature.

In the modification shown in FIG. 3, the second heated tapered roll 32 is made larger than the first heated tapered roll 30 in the diameter of the large end 32b and also in the angle of tapering. The cooled tapered rolls 34, 36 are also made larger in the same manner. By this modification the two-stage stretching of the web 10 to provide arcuate edges is further eased, and the curvatures of the arcuate edges can be increased without appearance of wrinkles or streaks on the stretched web.

Figure 6:
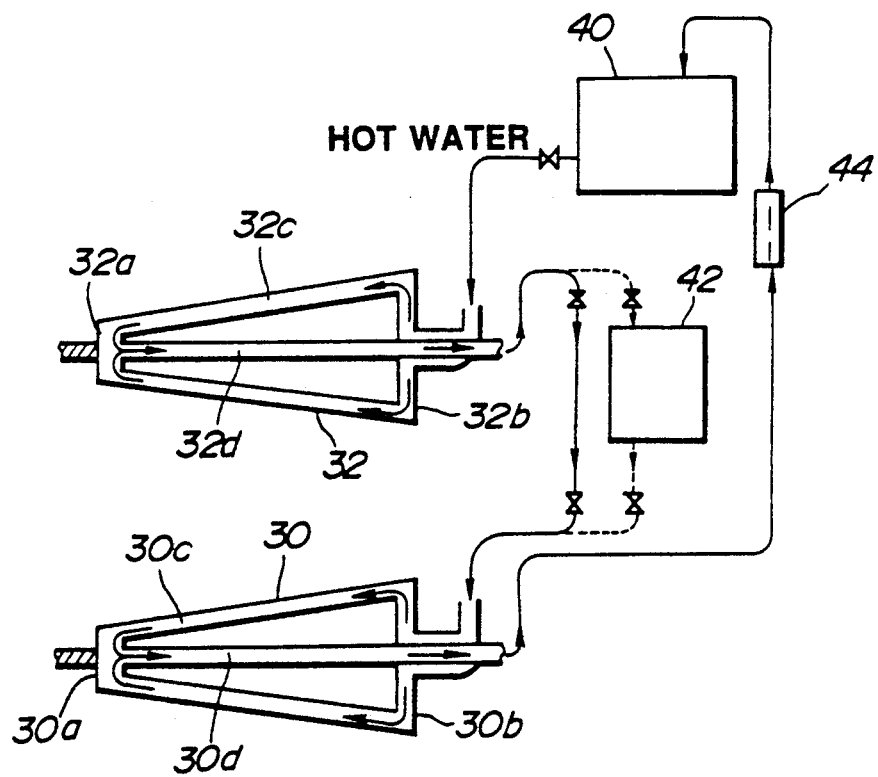
FIG. 6 is a diagram of a system for feeding hot water to two tapered rolls in the apparatus of FIG. 1.

FIG. 6 shows an outline of a sub-system to supply hot water to the tapered rolls 30 and 32. In the first tapered roll 30 there is a radially outer fluid passage 30c which extends near and parallel to the conical surface of the roll 30 over the entire length of the roll 30. An inlet to the fluid passage 30c is at the large diamter 30b of the roll 30. At the opposite end the fluid passage 30c connects with a central fluid passage 30d which extends along the axis of the roll 30 to an outlet at the large diameter end 30b. Similarly, the second tapered roll 32 is formed with a radially outer fluid passage 32c and a central fluid passage 32d.

From a hot water tank 40, hot water having a temperature of, e.g., 80° C. is first introduced into the second tapered roll 32 by the inlet at the large diameter end 32b. In the tapered roll 32 the hot water flows through the radially outer passage 32c toward the small diameter end 32a and then through the central passage 32d toward the large diameter end 32b. During the flow in the roll 32 the temperature of the hot water lowers usually by 3° to 5° C. The hot water discharged from the second roll 32 is introduced into the first tapered roll 30 by the inlet at the large diameter end 30b. If the temperature of the hot water is still too high, the hot water is passed through an auxiliary tank 42 where the water temperature is reduced by cooling or heat exchange to a desired level of, e.g., 70° C. In the first roll 30 the hot water flows first through the radially outer passage 30c toward the small diameter end 30c and then through the central passage 30d toward the outlet at the large diameter end 30b. During the flow in the roll 30 the water temperature lowers by about 3° to 5° C. The water discharged from the first roll 30 is introduced into a heat exchanger 44 to raise the water temperature to the initial level, 80° C., by using a suitable heat source such as steam. Then the hot water is returned to the tank 40.

Cold water is supplied to the tapered rolls 34 and 36 by a system analogous to the system of FIG. 6.

What is claimed is:

1. A method of stretching a continuous web of thermoplastic sheet having straight longitudinal edges into an arcuate form, the method comprising the steps of:
   (a) heating the web from both sides while the web is travelling substantially vertically downward so as to produce a gradient of temperature across the width of the web and raise the temperature of the web to a first temperature at a first longitudinal edge of the web and to a second temperature lower than said first temperature at a second longitudinal edge of the web;
   (b) passing the web heated in step (a) partially around a first tapered roll which is heated to a temperature higher than said first temperature and arranged such that said first longitudinal edge of the web is located relatively near the large diameter end of said tapered roll;
   (c) following step (b) passing the web partially around a second tapered roll which is heated to a temperature higher than the temperature of said first tapered roll and arranged such that said first longitudinal edge of the web is located relatively near the large diameter end of said second tapered roll; and
   (d) following step (c) passing the web partially around a plurality of cooled rolls each of which is a tapered roll arranged such that said first longitudinal edge is located relatively near the large diameter end of each cooled roll, throughout steps (b) or (d) the web being tensioned just sufficient for stretching the web into said arcuate shape.

2. A method according to claim 1, wherein the heating at step (a) is carried out by far-infrared radiation.

3. A method according to claim 2, wherein said first and second tapered rolls are heated by internal heating with hot water, said rolls being cooled by internal cooling with cold water.

4. A method of stretching a continuous web of polyvinyl butyral sheet having straight longitudinal edges into an arcuate form, the polyvinyl butyral sheet to be used as an interlayer of laminated glass, the method comprising the steps of:
   (a) heating the web from both sides while the web is travelling substantially vertically downward so as to produce a gradient of temperature across the width of the web and raise the temperature of the web to a first temperature in the range from about 50° C. to about 60° C. at a first longitudinal edge of the web and to a second temperature in the range from about 30° C. to about 40° C. at a second longitudinal edge of the web;
   (b) passing the web heated in step (a) partially around a first tapered roll which is heated to a temperature higher than said first temperature and arranged such that said first longitudinal edge of the web is located relatively near the large diameter end of said tapered roll;
   (c) following step (b) passing the web partially around a second tapered roll which is heated to a temperature higher than the temperature of said first tapered roll and arranged such that said first longitudinal edge of the web is located relatively near the large diameter end of said second tapered roll, the temperatures of said first and second tapered rolls being regulated such that while the web is in engagement with said second tapered roll the web reaches a third temperature in the range from 65° to 90° C. at said first longitudinal edge and a fourth temperature in the range from 45° to 60° at said second longitudinal edge; and
   (d) following step (c), successively passing the web partially around a plurality of cooled rolls each of which is a tapered roll arranged such that said first longitudinal edge is located relatively near the large diameter end of each cooled roll, the temperatures of said cooled rolls being regulated so as to cool the web to a temperature not higher than 15° before the web departs from the last one of said plurality of cooled rolls, throughout steps (b) or (d) the web being tensioned just sufficient for stretching the web into said arcuate shape.

5. A method according to claim 4, wherein the heating at step (a) is carried out by far-infrared radiation.

6. A method according to claim 5, wherein said first and second tapered rolls are heated by internal heating with hot water, said cooled rolls being cooled by internal cooling with cold water.

7. A method according to claim 4, wherein at step (b) the web is heated to a temperature in the range from 60° to 65° C. at said first longitudinal edge and to a temperature in the range from 40° to 50° C. at said second longitudinal edge.

8. A method according to claim 7, wherein at step (c) said third temperature is in the range from 65° to 70° C. and said fourth temperature is in the range from 52° to 58° C.

9. A method according to claim 4, wherein the web has a colored band to serve as a glare shield band along and contiguous to said second longitudinal edge.

* * * * *